United States Patent [19]

Cuer et al.

[11] Patent Number: 5,246,686
[45] Date of Patent: Sep. 21, 1993

[54] BASIC ALUMINUM CHLOROSULFATE FLOCCULATING AGENTS

[75] Inventors: Jean-Pierre Cuer, Francheville le Haut; Claude Aubineau, Sainte-Foy les Lyon; Claudine Bonnel, Herblay, all of France

[73] Assignee: Atochem, Puteaux, France

[21] Appl. No.: 817,983

[22] Filed: Jan. 8, 1992

Related U.S. Application Data

[63] Continuation of Ser. No. 683,039, Apr. 10, 1991, abandoned, which is a continuation of Ser. No. 301,710, Jan. 26, 1989, abandoned.

[30] Foreign Application Priority Data

Jan. 29, 1988 [FR] France .................. 88 01056

[51] Int. Cl.$^5$ ............................................. C01B 17/45
[52] U.S. Cl. ..................................... 423/467; 210/716; 210/723; 423/554; 423/555; 423/556
[58] Field of Search ............... 423/467, 556, 554, 555; 210/716, 723; 252/326, 327

[56] References Cited

U.S. PATENT DOCUMENTS

| 3,544,476 | 12/1970 | Aiba et al. | 423/556 |
| 3,929,666 | 12/1975 | Aiba et al. | 423/556 |
| 5,008,095 | 4/1991 | Boutin | 423/467 |
| 5,076,940 | 12/1991 | Boutin et al. | 210/716 |

FOREIGN PATENT DOCUMENTS

| 2547695 | 4/1976 | Fed. Rep. of Germany | 423/556 |
| 3338624 | 4/1984 | Fed. Rep. of Germany | 423/467 |
| 2559143 | 8/1985 | France | 423/556 |
| 1519291 | 7/1978 | United Kingdom . | |

*Primary Examiner*—Wayne Langel
*Attorney, Agent, or Firm*—Burns, Doane, Swecker & Mathis

[57] ABSTRACT

Novel basic aluminum chlorosulfate solutions, having a basicity ranging from 45% to 70% and wherein more than 80% of the $SO_4^{2-}$ values are complexed, prepared, e.g., by reacting calcium carbonate with a chlorosulfuric solution of aluminum, are useful coagulating and flocculating agents for the removal of impurities from aqueous media, notably to prepare potable water therefrom; the water thus treated contains but trace amounts of residual aluminum values.

6 Claims, No Drawings

BASIC ALUMINUM CHLOROSULFATE FLOCCULATING AGENTS

This application is a continuation, of application Ser. No. 07/683,039, filed Apr. 10, 1991 abandoned, which is a continuation of application Ser. No. 07/301,710, filed Jan. 26, 1989, abandoned.

BACKGROUND OF THE INVENTION

1. Field of the Invention

The present invention relates to a novel basic aluminum chlorosulfate, to a process for the preparation thereof, and to its use as a flocculating agent.

2. Description of the Prior Art

The treatment of effluents, sewage, spring waters or river waters almost always entails a stage in which suspended materials are removed. Products are known to this art which effect coagulation of these suspended or dissolved materials in the aqueous system to be treated, these being materials which cannot be separated in a reasonable time by natural separation. Moreover, these products convert such materials into coagulated flakes which are easy to filter and separate from the liquid phase.

FR 2,036,685, FR 2,226,361, and FR 2,534,897 describe products of this type and their applications. European Patent Application EP 218,487 describes a product intended to reduce the amount of aluminum remaining in the water after treatment.

SUMMARY OF THE INVENTION

A major object of the present invention is the provision of a novel chlorosulfate flocculant which is quite simple to use.

Briefly, the chlorosulfate according to the invention is a basic aluminum chlorosulfate which is in the form of an aqueous solution, having a certain degree of polymerization and comprising a composition of the formula:

$$Al_nCl_m(OH)_{3n+2k-m-2p}(SO_4)_p X_k$$

in which X is an alkaline earth metal, preferably calcium; n, m, p and k are the molar concentrations (mol/l) of the constituents in solution; and the basicity of which, $$\frac{3n + 2k - m - 2p}{3n},$$

ranges from 45% to 70%, with the proviso that less than 20% of the $SO_4^{2-}$ values can be precipitated by reaction with barium chloride at ambient temperature.

DETAILED DESCRIPTION OF THE PREFERRED EMBODIMENTS OF THE INVENTION

More particularly according to the present invention, the compositions of the above general formula are advantageously those in which the ratio of aluminum equivalents to chlorine, i.e., 3 n/m, is less than 2.8 and preferably less than 2.75.

Although it is possible to employ a wide range of basicity, normally products are used which have a basicity in the range of 50% to 70%. Different basicity values may be preferred, according to the particular applications intended. In particular, when preparing potable water, it has been observed that the higher the basicity, the lower the values of residual aluminum.

The nonprecipitation of most of the $SO_4^{2-}$ in the composition by barium salts indicates that this sulfate is complexed. Determination of the total content A of sulfate contained in the product is carried out in conventional manner by precipitating barium sulfate using a solution of barium chloride and hydrochloric acid which is added to the sample at its boiling point. When barium chloride is introduced at ambient temperature (i.e., 15° to 25° C.) into an unacidified sample, in a stoichiometric amount in relation to the $SO_4^{2-}$ ions present in the composition, the dry weight of the precipitate formed after 1 hour is related to the content B of so-called "non-complexed" $SO_4^{2-}$ ions.

The difference A-B is called the "content of complexed $SO_4^{2-}$ ions".

The composition of the invention which occurs in the form of an aqueous solution containing from 5% to 15% by weight of aluminum values, expressed as $Al_2O_3$, is mixed with an aqueous solution of barium chloride (for example from 5 to 20 g/l). The mixture is homogenized and the precipitate allowed to form over the course of about 1 hour, and then filtration is carried out through a sintered glass crucible of porosity grade No. 4. All of these operations, from mixing the chlorosulfate with the $BaCl_2$ up to the filtration take place at ambient temperature, i.e., in the range 15° to 25° C. The filtrate still contains the $SO_4^{2-}$ ions of the product of the invention which were not precipitated in the form of $BaSO_4$ and which are thus complexed. To determine this quantity of complexed $SO_4^{2-}$, the product is destroyed by adding hydrochloric acid to the filtrate and bringing it to a boil. Then the $SO_4^{2-}$ ions are precipitated by a 5% to 15% by weight aqueous solution of $BaCl_2$. Measuring the weight of $BaSO_4$ precipitated gives the percentage of $SO_4^{2-}$ ions which can be precipitated by reaction with barium chloride at ambient temperature, in comparison with the total amount of $SO_4^{2-}$ in the product.

Advantageously, the compositions have less than 10% of $SO_4^{2-}$ ions which can be precipitated under normal conditions, and preferably less than 5%, i.e., more than 95% of the $SO_4^{2-}$ ions are complexed.

The present invention also features a process for preparing these compositions. This process comprises:
(a) preparing an aqueous solution containing the aluminum ion, the chloride ion and the sulfate ion;
(b) contacting this solution with an alkaline earth metal compound; and
(c) recovering the alkaline earth metal sulfate.

Step (a) is advantageously carried out by contacting aluminum oxide with hydrochloric acid and sulfuric acid in an aqueous medium. By "aluminum oxide" is intended all compounds of the alumina or aluminum hydroxide type. It is preferred to use alumina produced by the Bayer process, or the aluminum hydroxides which are byproducts of the surface treatments of aluminum.

Advantageously, the aluminum oxide is attacked by a mixture of concentrated hydrochloric acid and concentrated sulfuric acid at a temperature in the range of 70 to 115° C. This temperature range is not critical, but corresponds only to a reaction period of one or two hours which is compatible with industrial applications of the process. It is possible to add aluminum oxide to a mixture of acids, or to react aluminum oxide with one acid followed by the other, or to add the acids in several portions. It is preferred to use a mixture of hydrochloric acid and sulfuric acid to acidulate the aluminum oxide, then add a further amount of concentrated sulfuric acid once a part of the aluminum oxide has been dissolved.

Also advantageously, a solution of hydrochloric acid more concentrated than 20% by weight is used, and preferably a 33% by weight solution. It is also advantageous to use sulfuric acid having a concentration of at least 60% by weight. Generally, the amount of hydrochloric acid, expressed in moles, ranges from 1.89 to 2.44 times the amount of aluminum oxide expressed in moles of $Al_2O_3$, and preferably in the range of 1.95 to 2.40.

Likewise, the amount of sulfuric acid, expressed in moles, (used in one or more portions) is generally in the range of 1.37 to 1.73 times the amount of aluminum oxide expressed in moles of $Al_2O_3$, and preferably in the range of 1.42 to 1.68.

The chlorosulfuric solution of aluminum from step (a) is subsequently contacted with the alkaline earth metal compound. This alkaline earth metal compound may be selected, for example, from among calcium carbonate, calcium hydroxide, calcium oxide or calcium bicarbonate. It is possible to use a mixture of such compounds, for example calcium carbonate and calcium hydroxide, with calcium carbonate being preferred. Advantageously, the alkaline earth metal compound is in a finely divided form, such as a powder. Although the procedure may be performed at any temperature, it is preferred to adjust the temperature of the chlorosulfuric aluminum solution to from 60° to 100° C. prior to contacting it with the alkaline earth metal compound.

Generally, 10 to 30 minutes are required for this contacting procedure, which corresponds to customary technological conditions, but is not beyond the scope of the invention to operate over a few minutes or over several hours.

The amount of the alkaline earth metal compound, expressed in moles, generally ranges from 1.63 to 1.70 times the amount of aluminum oxide introduced in step (a), expressed in moles of $Al_2O_3$, and preferably in the range of 1.65 to 1.68. The mixture may be maintained stirred when all of the alkaline earth metal compound has been mixed with the chlorosulfuric solution of aluminum. The temperature used is not critical, but generally ranges from 30° to 60° C.

Advantageously, this conclusion of step (b) lasts for from 15 minutes to 2 hours. Subsequently, it only remains to separate the alkaline earth metal sulfate. Conventional techniques may be used, such as filtration or centrifugation. This separation is preferably carried out above ambient temperature, for example at a temperature of from 30° to 60° C.

The filtrate contains the basic chlorosulfate of the invention dissolved in water. The concentration may be modified by adding water. The composition of the invention comprises such solution containing from 5% to 15% by weight of aluminum, expressed as $Al_2O_3$. This aqueous form has the advantage of being stable (no appearance of the solid phase) for several months at ambient temperature.

The present invention also features the use of the subject compositions as coagulating and flocculating agents for water treatment, particularly water purification to produce potable water.

Among the basic aluminum chlorosulfates according to the invention, those which concurrently (i) have a basicity greater than 60%, and (ii) whose weight ratio Cl/(total $SO_4^{2-}$) is in the range of 4.5 to 8, have, when they are used for the treatment of aqueous media, a treatment characteristic which at optimal flocculation is low in the associated properties relating to the aluminum remaining in solution (residual Al).

In order to further illustrate the present invention and the advantages thereof, the following specific examples are given, it being understood that same are intended only as illustrative and in nowise limitative.

EXAMPLE 1

Preparation of a composition according to the invention

Step (a): 3.09 moles of a powder containing 99% $Al(OH)_3$ were poured into a glass reaction vessel containing 3 moles of HCl in the form of 331.9 g of a 33% solution and 1.45 moles of $H_2SO_4$ as a 78% solution. The mixture was heated to 70° C. and then the temperature stabilized at 102° C. After dilution with 374 g of water, 1 mole of 78% sulfuric acid was added. The temperature increased to 112° C. over the course of 20 minutes. The duration of this step was about 2 hours.

Step (b): After cooling to 93° C., 2.60 moles of $CaCO_3$, i.e., 481.5 g of a 54% slurry of $CaCO_3$, were introduced over the course of 30 minutes. The reaction vessel was maintained stirred for 1 hour, 30 minutes, the temperature having decreased to 61° C.

Step (c): After cooling to 40° C., the mixture was filtered in a filtration apparatus under vacuum. The cake was washed with 100 g of water. The dry cake weighed 362 g and contained 7.73% by weight of aluminum, expressed as $Al_2O_3$, 53.4% of $SO_4^{2-}$, 1.35% of $Cl^-$, the remainder being calcium. 1,111 g of filtrate having a density of 1.224 were collected and were diluted with 109 g of water. The final product was in the form of a solution.

The solution weighed 1,220 g, had a relative density of 1,201 and contained 10.09% by weight of Al, expressed as $Al_2O_3$, 8.11% of $Cl^-$, 1.83% of $SO_4^{2-}$, 1.78% of complexed $SO_4^{2-}$ and 1.08% of $Ca^{2+}$, i.e., the ratio (Al equivalent)/Cl was 2.6, 97.3% of the $SO_4^{2-}$ ions being complexed.

The basicity was 64.18% and the weight ratio Cl/(total $SO_4^{2-}$) was 4.43.

EXAMPLE 2

Preparation of another composition according to the invention

The operation was carried out as in Example 1, but using different proportions of reactants. Starting again from 3.09 moles of $Al(OH)_3$, the duration of step (a) was 2 hours. Step (b) was for 2 hours and began at 90° C.

| Step (a): | |
| --- | --- |
| Final temperature: | 113.4° C. |
| HCl: | 3 moles |
| $H_2SO_4$: | 2.6 moles |
| Step (b): | |
| Final temperature: | 63° C. |
| $CaCO_3$: | 2.6 moles in the form of a 54% slurry. |

After separation of the calcium sulfate (step c) and dilution with water, the following composition was obtained, the percentages being by weight of the solution:

| Percentages in solution | |
|---|---|
| $Al_2O_3$ | 10.59% |
| Cl | 8.35% |
| Total $SO_4^{2-}$ | 2.13% |
| Complexed $SO_4^{2-}$ | 2.13% |
| Residual Ca | 0.77% |
| Al equivalents/Cl | 2.65 |
| Basicity | 61.29 |
| Complexed $SO_4^{2-}$ ions | 100% |
| Cl/(total $SO_4^{2-}$) | 3.92 |

EXAMPLE 3

Preparation of another composition according to the invention

The operation was carried out as in Example 1, but using different proportions of reactants. Starting from 3.09 moles of $Al(OH)_3$, the duration of step (a) was 2 hours. Step (b) was for 2 hours and began at 90° C.

| Step (a): | |
|---|---|
| Final temperature: | 112° C. |
| HCl: | 2.81 moles |
| $H_2SO_4$: | 2.25 moles |
| Step (b): | |
| Final temperature: | 62° C. |
| $CaCO_3$: | 2.38 moles in the form of a 54% slurry |

After separation of the calcium sulfate (step c) and dilution with water, the following composition was obtained, the percentages being by weight of the solution.

| Percentages in solution | |
|---|---|
| $Al_2O_3$ | 9.96% |
| Cl | 7.72% |
| Total $SO_4^{2-}$ | 1.50% |
| Complexed $SO_4^{2-}$ | 1.50% |
| Residual Ca | 0.66% |
| Al equivalent/Cl | 2.69 |
| Basicity | 63.2% |
| Complexed $SO_4^{2-}$ ions | 100% |
| Cl/(total $SO_4^{2-}$) | 5.15 |

EXAMPLE 4

Preparation of compositions not according to the invention

Their empirical formula is expressed in the same form as that of the compositions of the invention.

(4a) A basic aluminum chlorosulfate was produced according to the prior art, which was in the form of a solution containing in % by weight:

| Al | 10.3 (expressed as $Al_2O_3$) |
|---|---|
| Cl | 9.09 |
| Total $SO_4^{2-}$ | 2.49 |
| Basicity | 51.32%, the basicity being defined as for the compositions of the invention. |

The concentration of complexed $SO_4^{2-}$ ions was 1.64, i.e., 1.64/2.49, i.e., 65.9% of the sulfate, was complexed. The ratio (Al equiv.)/Cl was 2.37 and Cl/(total $SO_4^{2-}$) was 3.65. The product was produced by reacting aluminum with HCl and $H_2SO_4$ as in FR 2,036,685.

(4b) Another basic aluminum chlorosulfate was produced, in the form of a solution containing, in % by weight:

| Al | 8.3 (expressed as $Al_2O_3$) |
|---|---|
| Cl | 5.21 |
| Total $SO_4^{2-}$ | 5.02 |
| The basicity was 49.8%. | |

The concentration of complexed $SO_4^{2-}$ ions was 1.5, i.e., 1.5/5.02, i.e., 29.9% of the sulfate, was complexed. The ratio (Al equiv.)Cl was 3.32 and Cl/(total $SO_4^{2-}$) was 1.04.

This product was produced by a process which comprises a step in which a slurry of calcium chloride and calcium carbonate (chlorocarbonate slurry) was prepared, a step in which the chlorocarbonated slurry was contacted with the aluminum sulfate, then a step in which the reaction mixture thus obtained was separated, this being carried out by separating a cake of calcium sulfate and a filtrate containing the basic aluminum chlorosulfate. This process is described in European Patent Application EP 218,487.

Using quasi-elastic light scattering, an apparent hydrodynamic diameter ΦZ was measured on this product, giving 700 Å.

(4c) A product of the same type as in (4b) was produced. The concentrations were:

| Al | 8.55 (as $Al_2O_3$) |
|---|---|
| Cl | 6.82 |
| Total $SO_4^{2-}$ | 2.74 |
| Complexed $SO_4^{2-}$ | 1.93 |
| The basicity was 57% | |

The percentage of complexed $SO_4^{2-}$ was thus 1.93/2.74=70.4% and the ratios (Al equivalent)/Cl: 2.62 and Cl/(total $SO_4^{2-}$): 2.49.

EXAMPLE 5

This example illustrates the end applications of the compositions according to the invention.

A composition of the invention was compared with composition of Example 4.

Trials were carried out using test jars according to the following operating method:
(i) One-liter beaker
(ii) Temperature 15° C.
(iii) River water
(iv) Test jar HYDROCURE type SLH6
(v) Rapid stirring for 1 minute, 30 seconds, after addition of the flocculant, then slow stirring, i.e., sufficient to produce coalescence, but avoiding separation of the flocs.

Separation was subsequently permitted to occur for 3, 10 or 20 minutes according to Tables 1 to 7.

(vi) Measurement of the aluminum remaining in the water, using a colorimetric method employing choroazurol, after filtration of the separated water for 20 minutes, on a 0.45 μm filter.

The following tables report the type of water to be treated, its pH, the turbidity expressed in NTU and the organic matter in mg of oxygen per liter of water.

The composition used is referenced by the number of the example. The turbidity of the water at the surface after X minutes of separation, the final pH, the organic matter and the aluminum remaining in the water (residual Al) in ppb (µg/liter) are reported.

Tables 1 to 7 report said results.

TABLE 1

| COMPO-SITION Example No. | QUAN-TITY IN g/m³ (of Al₂O₃) | TURBIDITY OF THE SUPER-NATANT | | | Final pH | O.M. | Residual Al |
|---|---|---|---|---|---|---|---|
| | | 3 min | 10 min | 20 min | | | |
| 4a | 4 | 2.1 | 1.45 | 1.3 | 7.7 | 2.76 | 148 |
| 1 | 4 | 1.8 | 1.35 | 1.2 | 7.84 | 2.72 | 97 |

Water type: Seine water
pH: 7.97
Turbidity: 42 NTU
Organic matter (O.M.): 6.96 mg O₂/l

TABLE 2

| COMPO-SITION Example No. | QUAN-TITY IN g/m³ (of Al₂O₃) | TURBIDITY OF THE SUPER-NATANT | | | Final pH | O.M. | Residual Al |
|---|---|---|---|---|---|---|---|
| | | 3 min | 10 min | 20 min | | | |
| 4a | 3 | 1.7 | 1.6 | 1.5 | 7.78 | 2.94 | 152 |
| 4c | 3 | 1.7 | 1.55 | 1.45 | 7.80 | 2.78 | 152 |
| 1 | 3 | 1.8 | 1.6 | 1.4 | 7.80 | 2.66 | 118 |

Water type: Marne water
pH: 8.02
Turbidity: 60 NTU
Organic matter (O.M.): 6.68 mg O₂/l

TABLE 3

| COMPO-SITION Example No. | QUAN-TITY IN g/m³ (of Al₂O₃) | TURBIDITY OF THE SUPER-NATANT | | | Final pH | O.M. | Residual Al |
|---|---|---|---|---|---|---|---|
| | | 3 min | 10 min | 20 min | | | |
| 4a | 3 | 1.55 | 1.55 | 1.35 | 7.90 | 2.12 | 216 |
| 4c | 3 | 1.6 | 1.55 | 1.3 | 7.92 | 2.14 | 212 |
| 1 | 3 | 1.7 | 1.55 | 1.45 | 7.97 | 2.08 | 165 |

Water type: Marne water
pH: 8.26 (was modified by adding sodium hydroxide)
Turbidity: 55 NTU
Organic matter (O.M.): 5.94 mg O₂/l

TABLE 4

| COMPO-SITION Example No. | QUAN-TITY IN g/m³ (of Al₂O₃) | TURBIDITY OF THE SUPER-NATANT | | | Final pH | O.M. | Residual Al |
|---|---|---|---|---|---|---|---|
| | | 3 min | 10 min | 20 min | | | |
| 1 | 3 | 1 | 0.88 | 0.80 | 7.88 | 2.94 | 89 |
| 4a | 3 | 0.98 | 0.93 | 0.91 | 7.84 | 3.10 | 123 |
| 4b | 3 | 1.2 | 1.02 | 0.91 | 7.82 | 3.08 | 120 |

Water type: Oise water
pH: 7.99
Turbidity: 9.9 NTU
Organic matter (O.M.): 5.64 mg O₂/l

TABLE 5

| COMPO-SITION Example No. | QUAN-TITY IN g/m³ (of Al₂O₃) | TURBIDITY OF THE SUPER-NATANT | | | Final pH | O.M. | Residual Al |
|---|---|---|---|---|---|---|---|
| | | 3 min | 10 min | 20 min | | | |
| 1 | 3 | 0.94 | 0.83 | 0.72 | 8.08 | 2.86 | 163 |
| 4a | 3 | 1.05 | 1 | 0.99 | 8.03 | 2.86 | 242 |
| 4b | 3 | 1.25 | 0.99 | 0.93 | 8.02 | 2.88 | 238 |

Water type: Oise water
pH: 8.24 (after adding sodium hydroxide)
Turbidity: 21 NTU
Organic matter (O.M.): 6.92 mg O₂/l It will be seen that even with a very basic water, the compositions of the invention enable a concentration to be achieved which was below the maximum permissible figure of 200 µg/l given in the European Council Directive, of 15th July 1980.

TABLE 6

| COMPO-SITION Example No. | QUAN-TITY IN g/m³ (of Al₂O₃) | TURBIDITY OF THE SUPER-NATANT | | | Final pH | O.M. | Residual Al |
|---|---|---|---|---|---|---|---|
| | | 3 min | 10 min | 20 min | | | |
| 4a | 4 | 2.1 | 1.45 | 1.3 | 7.7 | 2.76 | 148 |
| 2 | 4 | 2.2 | 1.2 | 1.3 | 7.77 | 2.72 | 117 |
| 1 | 4 | 3 | 1.4 | 1.3 | 7.81 | 2.72 | 104 |

Water type: Seine water
pH: 7.97
Turbidity: 42 NTU
Organic matter (O.M.): 6.96 mg O₂/l

TABLE 7

| COMPO-SITION Example No. | QUAN-TITY IN g/m³ (of Al₂O₃) | TURBIDITY OF THE SUPER-NATANT | | | Final pH | O.M. | Residual Al |
|---|---|---|---|---|---|---|---|
| | | 3 min | 10 min | 20 min | | | |
| 4a | 3 | 1.7 | 1.6 | 1.5 | 7.78 | 2.94 | 152 |
| 4c | 3 | 1.7 | 1.55 | 1.45 | 7.80 | 2.78 | 152 |
| 2 | 3 | 1.8 | 1.6 | 1.5 | 7.82 | 2.72 | 128 |
| 1 | 3 | 1.8 | 1.6 | 1.4 | 7.80 | 2.66 | 118 |

Water type: Marne water
pH: 8.02
Turbidity: 60 NTU
Organic matter (O.M.): 6.68 mg O₂/l

EXAMPLE 6

This example compares the results for turbidity and residual aluminum with the compositions according to the invention from Examples 1 and 3 when they are used at low treatment concentrations: 1, 1.5, 2 and 3 g/m³ of Al₂O₃.

The trials were carried out in test jars according to the operating method described in Example 5, in water of the Seine water type.

Table 8 reports the values of pH, turbidity and amount of organic matter in the Seine water, which had been measured before treatment using the compositions of Examples 1 and 3 (trails A to P).

TABLE 8

| TEST NO. | WATER pH | TURBIDITY (NTU) | O.M. (mg O₂/l) |
|---|---|---|---|
| A | | | 5.88 |
| B-C | | | 6.08 |
| D-E | 8.02 | 8.2 | |
| F-G | 8.05 | 7.4 | |
| H-I | | 10 | 5.88 |
| J-K | | 10 | 5.48 |
| L | 8.1 | 12 | 4.68 |
| M-N | 8 | 8.3 | |
| O-P | 7.91 | 12 | |

Table 9 reports the mean values of the results obtained using the composition of Example 3 for reference. The percentages which are reported are obtained in the following manner:

different in parameter $x$ (%) =

$$\frac{\text{value of } x \text{ for Example } i}{\text{value } x \text{ for Example 3}} \times 100 - 100$$

where i=1 or 3 N.B. The differences are not truly significant unless their absolute value is greater than or equal to 5%.

TABLE 9

| COMPO-SITION Example No. | QUAN-TITY IN g/m³ (of Al₂O₃) | DIFFERENCE IN TURBIDITY OF THE SUPERNATANT (%) | | | O.M. (%) | Re-sidual Al |
|---|---|---|---|---|---|---|
| | | 3 min | 10 min | 20 min | | |
| 1 | | 14 | 9.3 | 8.9 | −0.7 | — |
| 3 | 1 | 0 | 0 | 0 | 0 | 0 |
| 1 | | 18 | 9.2 | 6 | 1.8 | −10 |
| 3 | 1.5 | 0 | 0 | 0 | 0 | 0 |
| 1 | | 20 | 9.9 | 3.3 | | |
| 3 | 2 | 0 | 0 | 0 | 0 | 0 |
| 1 | | 5.25 | 0.34 | −2.4 | — | — |
| 3 | 3 | 0 | 0 | 0 | 0 | 0 |

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims, including equivalents thereof.

What is claimed is:

1. A process for preparing an aqueous solution of a basic aluminum chlorosulfate, which comprises (a) contacting aluminum oxide with hydrochloric and sulfuric acids to prepare an aqueous solution of aluminum chlorosulfate containing aluminum, chloride and sulfate ions, (b) contacting the solution of (a) with an alkaline earth metal compound, and (c) recovering an alkaline earth metal basic aluminum chlorosulfate solution comprising an aqueous solution of a basic aluminum chlorosulfate having the formula:

$$Al_nCl_m(OH)_{3n+2k-m-2p}(SO_4)_pX_k$$

in which X is an alkaline earth metal; n, m, p and k are the molar concentrations greater than zero, in mol/l, of the respective constituents in solution; and the basicity of which, expressed as the ratio:

$$\frac{3n + 2k - m - 2p}{3n}$$

ranges form 45% to 70%, with a proviso that less than 20% of the $SO_4{}^{2-}$ values can be precipitated by reaction with barium chloride at ambient temperature.

2. The process as defined by claim 1, said alkaline earth metal compound comprising calcium carbonate, calcium hydroxide, calcium oxide or calcium bicarbonate.

3. The process as defined by claim 1, wherein the amount of said hydrochloride acid ranges from 1.89 to 2.44 times the amount of said aluminum oxide, expressed in mols of $Al_2O_3$.

4. The process as defined by claim 1, wherein the amount of said sulfuric acid, ranges from 1.37 to 1.73 times the amount of aluminum oxide, expressed in mols of $Al_2O_3$.

5. The process as defined by claim 1, wherein the temperature of the solution prior to contacting it with said alkaline earth metal compound ranges from about 60° C. to about 100° C.

6. The process as defined by claim 1, wherein the amount of said alkaline earth metal compound, range from 1.63 to 1.70 times the amount of aluminum oxide introduced in Step (a), expressed in mols of $Al_2O_3$.

* * * * *